US011974386B2

(12) United States Patent
Fisher et al.

(10) Patent No.: US 11,974,386 B2
(45) Date of Patent: Apr. 30, 2024

(54) IRRADIATION TARGETS FOR THE PRODUCTION OF RADIOISOTOPES

(71) Applicant: BWXT Isotope Technology Group, Inc., Lynchburg, VA (US)

(72) Inventors: Benjamin D. Fisher, Lynchburg, VA (US); Earl B. Barger, Goode, VA (US); William E. Russell, II, Lynchburg, VA (US)

(73) Assignee: BWXT Isotope Technology Group, Inc., Lynchburg, VA (US)

(*) Notice: Subject to any disclaimer, the term of this patent is extended or adjusted under 35 U.S.C. 154(b) by 0 days.

(21) Appl. No.: 17/836,041

(22) Filed: Jun. 9, 2022

(65) Prior Publication Data

US 2022/0312578 A1 Sep. 29, 2022

Related U.S. Application Data

(62) Division of application No. 15/902,534, filed on Feb. 22, 2018, now Pat. No. 11,363,709.

(Continued)

(51) Int. Cl.

| | |
|---|---|
| ***H05H 6/00*** | (2006.01) |
| ***G21G 1/00*** | (2006.01) |
| ***G21G 1/02*** | (2006.01) |
| ***G21G 1/10*** | (2006.01) |
| ***G21G 4/00*** | (2006.01) |

(Continued)

(52) U.S. Cl.

CPC .............. *H05H 6/00* (2013.01); *G21G 1/001* (2013.01); *G21G 1/02* (2013.01); *G21G 1/10* (2013.01); *G21G 4/00* (2013.01); *G21G 4/06* (2013.01); *G21G 2001/0036* (2013.01); *G21G 1/06* (2013.01)

(58) Field of Classification Search

CPC .............. H05H 6/00; G21G 1/02; G21G 1/06

See application file for complete search history.

(56) References Cited

U.S. PATENT DOCUMENTS

| | | | |
|---|---|---|---|
| 3,140,393 | A | 7/1964 | Busch |
| 3,436,354 | A | 4/1969 | Gemmill |

(Continued)

FOREIGN PATENT DOCUMENTS

| | | | |
|---|---|---|---|
| CA | 2735612 | A1 | 10/2011 |
| CN | 101905155 | A | 12/2010 |

(Continued)

OTHER PUBLICATIONS

Cockeram, B. V., R. W. Smith, and L. L. Snead. "The influence of fast neutron irradiation and irradiation temperature on the tensile properties of wrought LCAC and TZM molybdenum." Journal of nuclear materials 346.2-3 (2005): 145-164. (Year: 2005).*

(Continued)

*Primary Examiner* — Sharon M Davis

(74) *Attorney, Agent, or Firm* — Nelson Mullins Riley & Scarborough LLP

(57) ABSTRACT

An irradiation target for the production of radioisotopes, comprising at least one plate defining a central opening and an elongated central member passing through the central opening of the at least one plate so that the at least one plate is retained thereon, wherein the at least one plate and the elongated central member are both formed of materials that produce molybdenum-99 (Mo-99) by way of neutron capture.

8 Claims, 11 Drawing Sheets

Related U.S. Application Data

(60) Provisional application No. 62/592,737, filed on Nov. 30, 2017, provisional application No. 62/463,020, filed on Feb. 24, 2017.

(51) Int. Cl.
*G21G 4/06* (2006.01)
*G21G 1/06* (2006.01)

(56) References Cited

U.S. PATENT DOCUMENTS

| | | | |
|---|---|---|---|
| 3,607,007 | A | 9/1971 | Chiola et al. |
| 3,666,822 | A | 5/1972 | Grasselli et al. |
| 4,141,861 | A | 2/1979 | Courty et al. |
| 4,196,047 | A | 4/1980 | Mitchem et al. |
| 4,273,745 | A | 6/1981 | Laferty et al. |
| 4,280,053 | A | 7/1981 | Evans et al. |
| 4,360,495 | A | 11/1982 | Bauer |
| 4,440,729 | A | 4/1984 | Jonsson |
| 4,487,850 | A | 12/1984 | Li |
| 4,525,331 | A | 6/1985 | Cheresnowsky et al. |
| 4,756,746 | A | 7/1988 | Kemp, Jr. et al. |
| 4,760,638 | A | 8/1988 | Ott et al. |
| 5,382,388 | A | 1/1995 | Ehrhardt et al. |
| 5,615,238 | A | 3/1997 | Wiencek et al. |
| 5,802,438 | A | 9/1998 | Bennett et al. |
| 5,821,186 | A | 10/1998 | Collins |
| 6,113,795 | A | 9/2000 | Subramaniam et al. |
| 6,136,740 | A | 10/2000 | Jones et al. |
| 6,160,862 | A | 12/2000 | Wiencek et al. |
| 6,208,704 | B1 | 3/2001 | Lidsky et al. |
| 9,550,704 | B2 | 1/2017 | Chi et al. |
| 10,820,404 | B2 | 10/2020 | Cross et al. |
| 2005/0063514 | A1 | 3/2005 | Price et al. |
| 2005/0156144 | A1 | 7/2005 | Fukushima et al. |
| 2007/0133734 | A1 | 6/2007 | Fawcett et al. |
| 2007/0155976 | A1 | 7/2007 | Hunter et al. |
| 2008/0006606 | A1 | 1/2008 | Magnaldo |
| 2009/0135990 | A1 | 5/2009 | Poon et al. |
| 2009/0274258 | A1 | 11/2009 | Holden et al. |
| 2010/0183045 | A1 | 7/2010 | Nakahara et al. |
| 2011/0006186 | A1 | 1/2011 | Allen et al. |
| 2011/0009686 | A1 | 1/2011 | Allen et al. |
| 2011/0051875 | A1 | 3/2011 | Bloomquist et al. |
| 2012/0027152 | A1 | 2/2012 | Reese et al. |
| 2012/0281799 | A1 | 11/2012 | Wells et al. |
| 2013/0301769 | A1 | 11/2013 | Schaffer et al. |
| 2014/0029710 | A1 | 1/2014 | Wilson et al. |
| 2014/0226773 | A1 | 8/2014 | Toth et al. |
| 2015/0023876 | A1 | 1/2015 | Cope et al. |
| 2017/0048962 | A1 | 2/2017 | Zeisler et al. |
| 2017/0251547 | A1 | 8/2017 | Ito |
| 2018/0244535 | A1 | 8/2018 | Russell et al. |
| 2018/0244536 | A1 | 8/2018 | Russell et al. |

FOREIGN PATENT DOCUMENTS

| | | | |
|---|---|---|---|
| GB | 1157117 | A | 7/1969 |
| JP | H07218697 | A | 8/1995 |
| JP | 2011015970 | A | 1/2011 |
| JP | 2011017703 | A | 1/2011 |
| JP | 2011047935 | A | 3/2011 |
| JP | 2011047938 | A | 3/2011 |
| JP | 6697396 | B2 | 5/2020 |
| RU | 2200997 | C2 | 3/2003 |
| RU | 2403086 | C2 | 11/2010 |
| RU | 2462793 | C2 | 9/2012 |
| RU | 2 511 215 | C1 | 4/2014 |
| RU | 2560966 | C2 | 8/2015 |
| RU | 2014147619 | A | 6/2016 |
| RU | 2630475 | C2 | 9/2017 |
| SU | 927753 | A1 | 5/1982 |
| WO | 94/04463 | A2 | 3/1994 |
| WO | 2018/156828 | A1 | 8/2018 |
| WO | 2018/156835 | A1 | 8/2018 |
| WO | 2018/156910 | A1 | 8/2018 |

OTHER PUBLICATIONS

Clearfield, A., and R. H. Blessing. "The preparation and crystal structure of a basic zirconium molybdate and its relationship to ion exchange gels," Journal of Inorganic and Nuclear Chemistry, vol. 34 (8): 2643-2663 (1972) Abstract Only.

Extended European Search Report, European Application No. 118757129.4, dated Nov. 17, 2020, 8 pages.

Extended European Search Report, European Application No. 18758164.0 , dated Oct. 20, 2020, 9 pages.

Extended European Search Report, European Application No. 18758354.7, dated Nov. 25, 2020, 7 pages.

International Preliminary Report on Patentability, PCT/US2018/019322, dated Aug. 27, 2019, 17 pages.

International Preliminary Report on Patentability, PCT/US2018/019335, dated Aug. 27, 2019, 21 pages.

International Preliminary Report on Patentability, PCT/US2018/019443, dated Aug. 27, 2019, 5 pages.

International Search Report and Written Opinion of corresponding International Application PCT/US2018/019322, dated Jul. 11, 2018, 20 pages.

International Search Report and Written Opinion of corresponding International Application PCT/US2018/019335, dated May 7, 2018, 22 pages.

International Search Report and Written Opinion of corresponding International Application PCT/US2018/019443, dated Jul. 9, 2018, 6 pages.

Invitation to Pay Additional Fees, and, Where Applicable, Protest Fee, PCT/US2018/19322, dated Apr. 24, 2018, 2 pages.

Lidin R.A et al., Khinicheskie svojstava neorganicheskikh vishchestv, Moscow, Khimia, 1997, p. 388, section 772, reaction 3, 5 pages.

Monroy-Guzman et al., "Titanium Molybdate Gels as Matrix of 99Mo/99mTc Generators", Journal of Nuclear and Radiochemical Sciences, vol. 8, No. 1 (Jan. 2007), p. 11-19.

Monroy-Guzman F. et al., "Determination of Mo, W and Zr in molybdates and tungstates of zirconium and titanium," Journal of Radioanalytical and Nuclear Chemistry, vol.vol. 271(3):523-532 (2007).

Scadden et al., "Radiochemistry of Molybdenum," National Academy of Sciences, pp. 1-38 (1960).

Experimental Nuclear Reaction Database dated Aug. 20, 2020.

* cited by examiner

IRRADIATION TARGETS FOR THE PRODUCTION OF RADIOISOTOPES

CROSS-REFERENCE TO RELATED APPLICATIONS

The present application is a Division of U.S. patent application Ser. No. 15/902,534 filed Feb. 22, 2018, now U.S. Pat. No. 11,363,709, which claims the benefit of U.S. Provisional Patent Application No. 62/463,020 filed Feb. 24, 2017 and U.S. Provisional Patent Application No. 62/592,737 filed Nov. 30, 2017, the disclosures of which are hereby incorporated by reference in their entirety.

TECHNICAL FIELD

The presently disclosed invention relates generally to titanium-molybdate-99 materials suitable for use in technetium-99m generators (Mo-99/Tc-99m generators) and, more specifically, irradiation targets used in the production of those titanium-molybdate-99 materials.

BACKGROUND

Technetium-99m (Tc-99m) is the most commonly used radioisotope in nuclear medicine (e.g., medical diagnostic imaging). Tc-99m (m is metastable) is typically injected into a patient and, when used with certain equipment, is used to image the patient's internal organs. However, Tc-99m has a half-life of only six (6) hours. As such, readily available sources of Tc-99m are of particular interest and/or need in at least the nuclear medicine field.

Given the short half-life of Tc-99m, Tc-99m is typically obtained at the location and/or time of need (e.g., at a pharmacy, hospital, etc.) via a Mo-99/Tc-99m generator. Mo-99/Tc-99m generators are devices used to extract the metastable isotope of technetium (i.e., Tc-99m) from a source of decaying molybdenum-99 (Mo-99) by passing saline through the Mo-99 material. Mo-99 is unstable and decays with a 66-hour half-life to Tc-99m. Mo-99 is typically produced in a high-flux nuclear reactor from the irradiation of highly-enriched uranium targets (93% Uranium-235) and shipped to Mo-99/Tc-99m generator manufacturing sites after subsequent processing steps to reduce the Mo-99 to a usable form. Mo-99/Tc-99m generators are then distributed from these centralized locations to hospitals and pharmacies throughout the country. Since Mo-99 has a short half-life and the number of production sites are limited, it is desirable to minimize the amount of time needed to reduce the irradiated Mo-99 material to a useable form.

There at least remains a need, therefore, for a process for producing a titanium-molybdate-99 material suitable for use in Tc-99m generators in a timely manner.

SUMMARY OF INVENTION

One embodiment of the present invention provides an irradiation target for the production of radioisotopes, including at least one plate defining a central opening and an elongated central member passing through the central opening of the at least one plate so that the at least one plate is retained thereon. The at least one plate and the elongated central member are both formed of materials that produce molybdenum-99 (Mo-99) by way of neutron capture.

Another embodiment of the present invention provides a method of producing an irradiation target for use in the production of radioisotopes, including the steps of providing at least one plate defining a central opening, providing an elongated central member having a first end and a second end, passing the central member through the central opening of the at least one plate, and expanding the first end and the second end of the central member radially outwardly with respect to a longitudinal center axis of the central member so that an outer diameter of the first end and the second end are greater than a diameter of the central opening of the at least one plate.

The accompanying drawings, which are incorporated in and constitute a part of this specification, illustrate one or more embodiments of the invention and, together with the description, serve to explain the principles of the invention.

BRIEF DESCRIPTION OF THE DRAWING(S)

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

Figure 1:
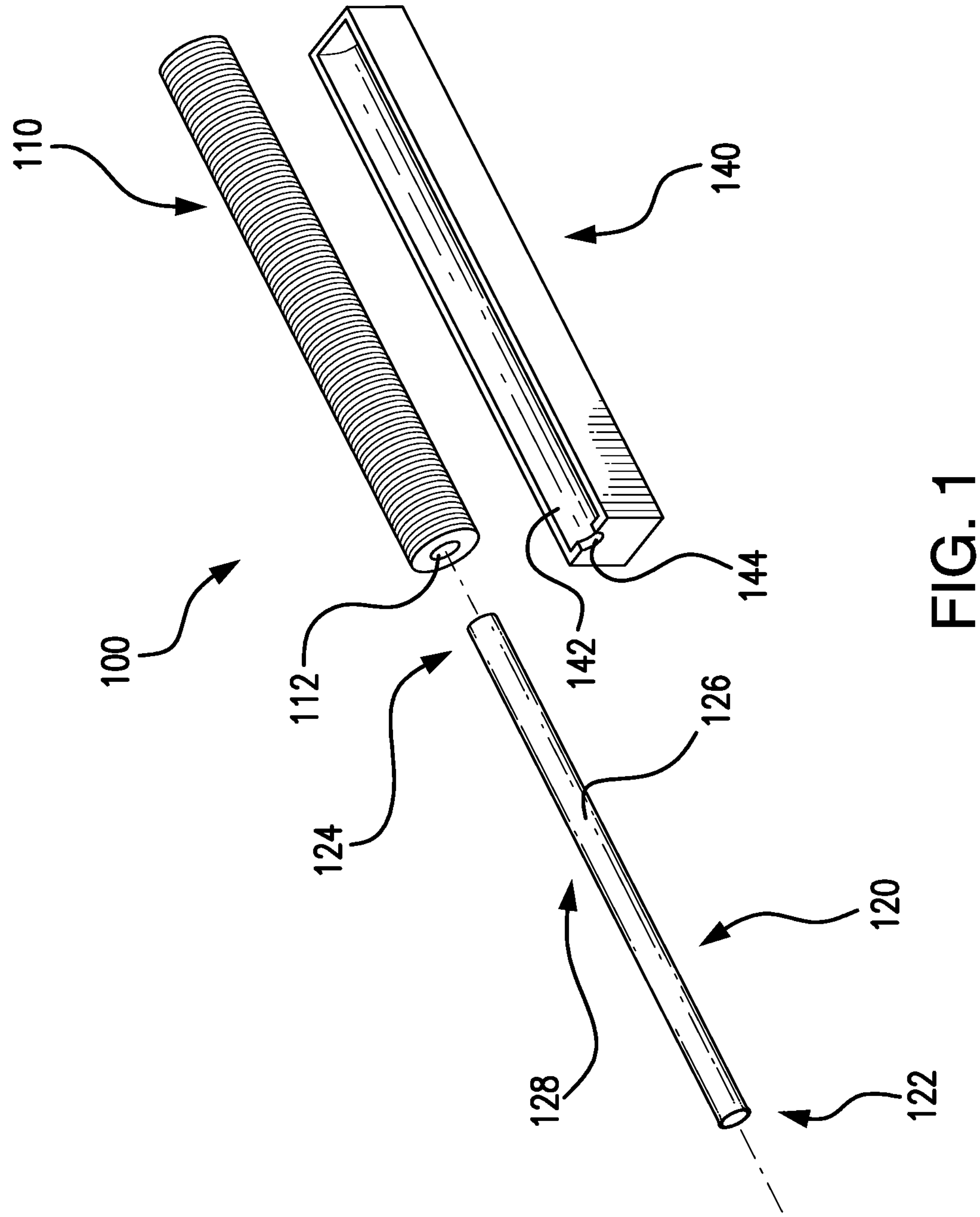
FIG. 1 is an exploded, perspective view of an irradiation target in accordance with an embodiment of the present invention.

Repeat use of reference characters in the present specification and drawings is intended to represent same or analogous features or elements of the invention according to the disclosure.

DETAILED DESCRIPTION

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Referring now to the figures, an irradiation target 100 in accordance with the present invention includes a plurality of thin plates 110 that are slideably received on a central tube 120, as best seen in FIGS. 1 and 2A through 2C. Preferably, both the plurality of thin plates 110 and central tube 120 are formed from the same material, the material being one that is capable of producing the isotope molybdenum-99 (Mo-99) after undergoing a neutron capture process in a nuclear reactor, such as a fission-type nuclear reactor. In the preferred embodiment, this material is Mo-98. Note, however, in alternate embodiments, plates 110 and central tube 120 may be formed from materials such as, but not limited to, Molybdenum Lanthanum (Mo—La), Titanium Zirconium Molybdenum (Ti—Zr—Mo), Molybdenum Hafnium Carbide (Mo Hf—C), Molybdenum Tungsten (Mo—W), Nickel Cobalt Chromium Molybdenum (Mo-MP35N), and Uranium Molybdenum (U—Mo). As well, although the presently discussed embodiment preferably has an overall length of 7.130 inches and an outer diameter of 0.500 inches, alternate embodiments of irradiation targets in accordance with the present invention will have varying dimensions dependent upon the procedures and devices that are used during the irradiation process.

Figure 3A:
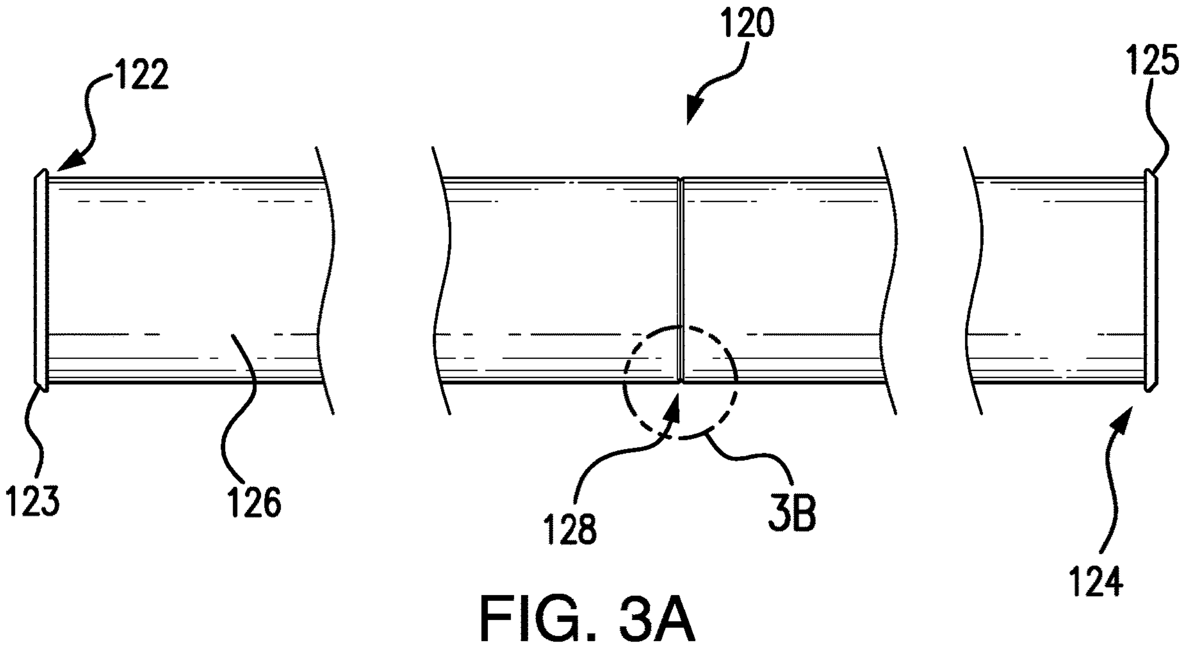
FIGS. 3A and 3B are partial views of a central tube of the irradiation target as shown in FIG. 1.
Figure 3B:
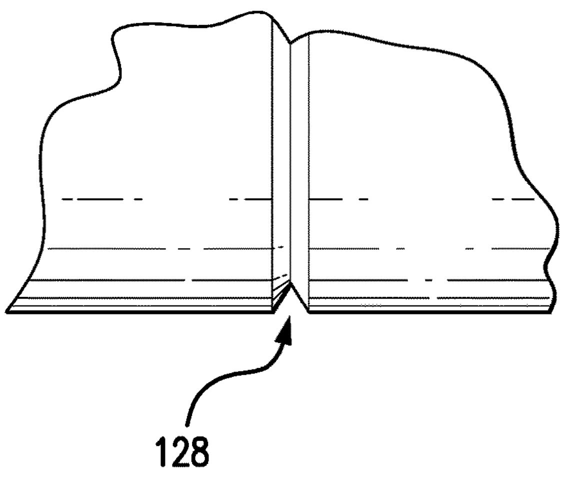

Referring additionally to FIGS. 3A and 3B, central tube 120 includes a first end 122, a second end 124, and a cylindrical body having a cylindrical outer surface 126 extending therebetween. In the discussed embodiment, central tube 120 has an outer diameter of 0.205 inches, a tube wall thickness of 0.007 inches, and a length that is slightly greater than the overall length of the plurality of thin plates of irradiation target 100. Prior to assembly of irradiation target 100, central tube 120 has a constant outer diameter along its entire length, which, as noted, is slightly longer than the length of the fully assembled irradiation target. The constant outer diameter of central tube 120 allows either end to be slid through the plurality of thin plates 110 during the assembly process, as discussed in greater detail below.

Figure 7A:
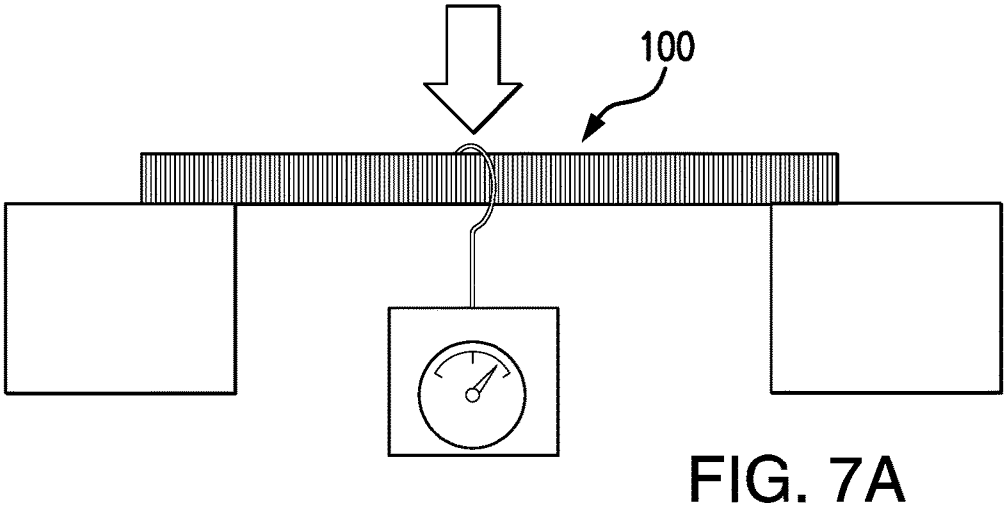
FIGS. 7A and 7B are views of an irradiation target undergoing snap test loading after irradiation.
Figure 7B:
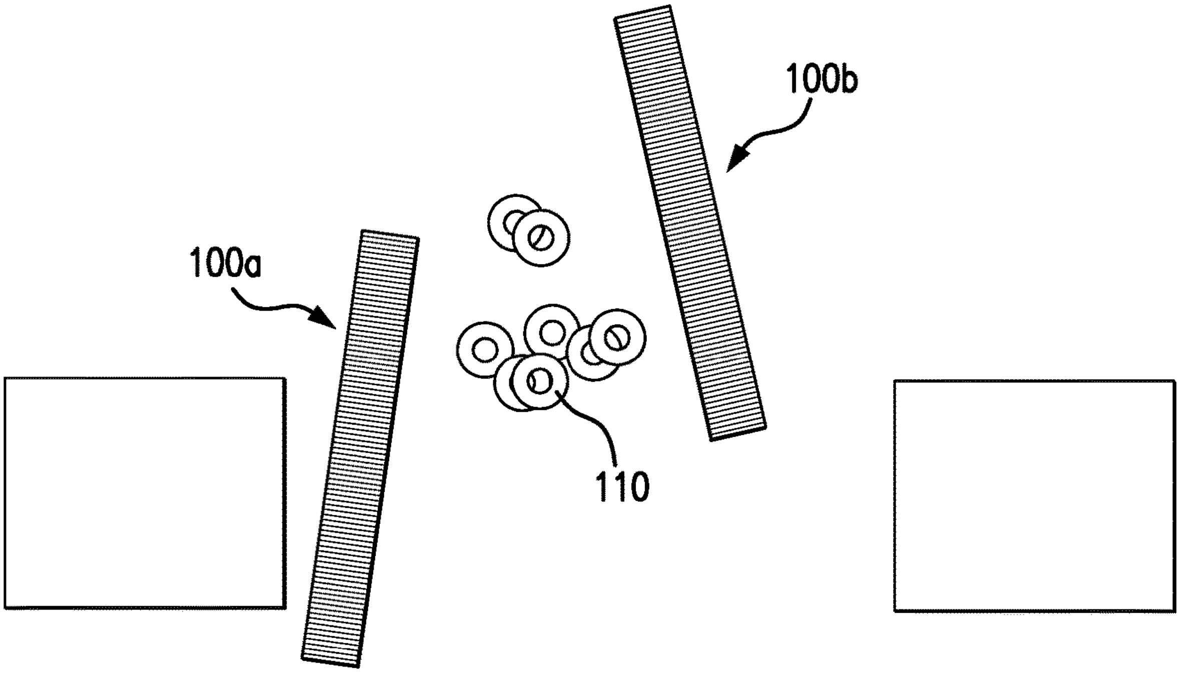
Figure 8:
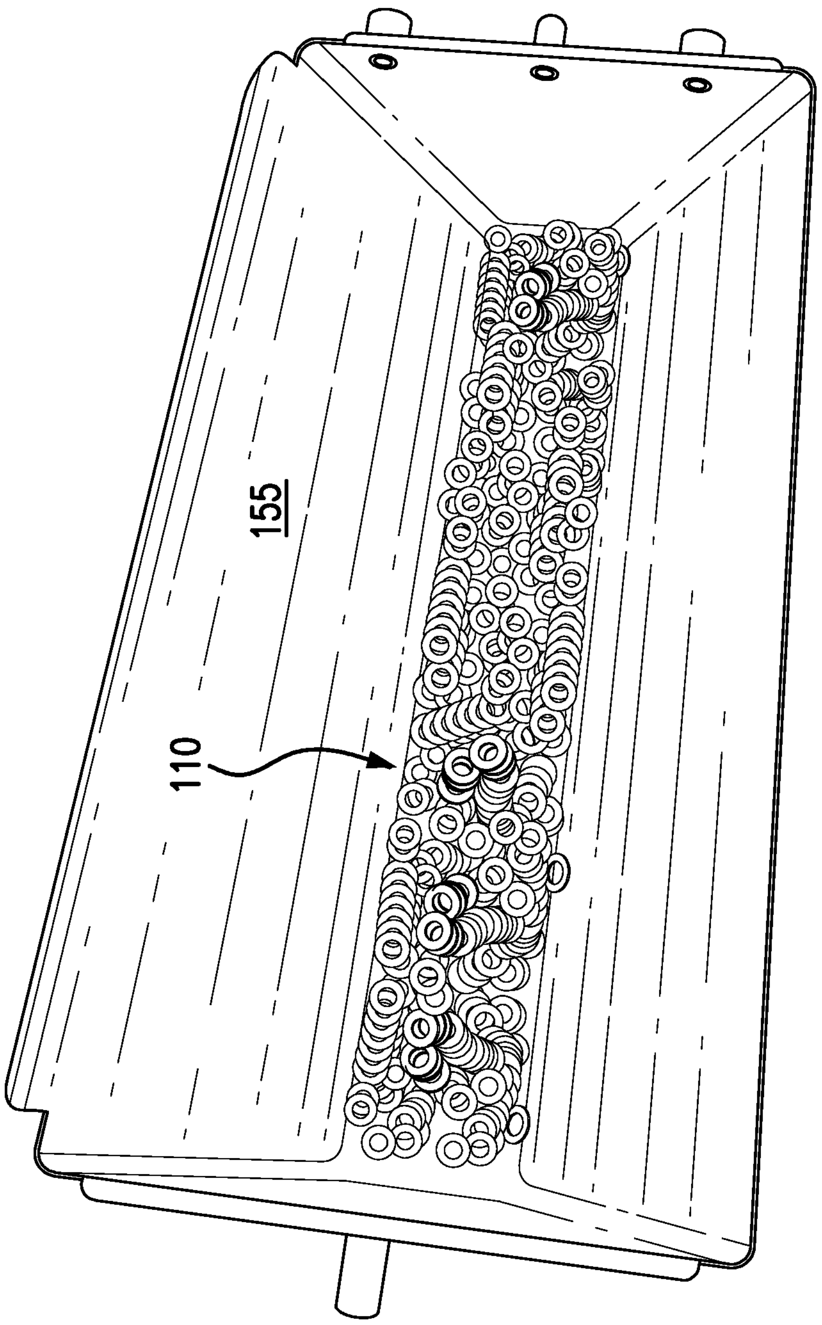
FIG. 8 is a perspective view of a hopper including the irradiated components of a target assembly, such as the one shown in FIG. 1, after both irradiation and disassembly.

As best seen in FIG. 3B, prior to inserting central tube 120 into the plurality of thin plates 110, an annular groove 128 is formed in the outer surface 126 of central tube 120 at its middle portion. In the preferred embodiment, the depth of annular groove for the given wall thickness of 0.007 inches is approximately 0.002 inches. The depth of annular groove is selected such that irradiation target 100 breaks into two portions 100*a* and 100*b* along the annular groove of central tube 120, rather than bending, when a sufficient amount of force is applied transversely to the longitudinal center axis of the irradiation target as its mid-portion, as shown in FIGS. 7A and 7B. As such, as shown in FIG. 8, thin plates 110 are free to be removed from their corresponding tube halves and be collected, such as in a hopper 155, for further processing. As would be expected, the depth of annular groove is dependent upon the wall thickness of the central tube and will vary in alternate embodiments. As well, testing has revealed that an axial loading of 10-30 lbs. of thin plates 110 along central tube 120 facilitates a clean break of the tube rather than potential bending.

Figure 2C:
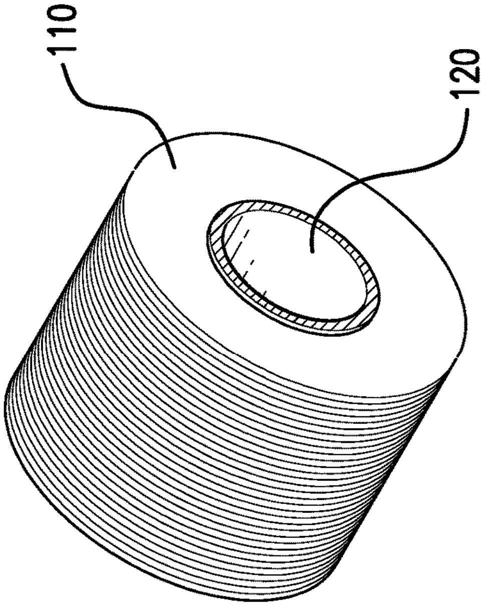
FIGS. 2A-2C are partial views of the irradiation target as shown in FIG. 1.
Figure 2B:
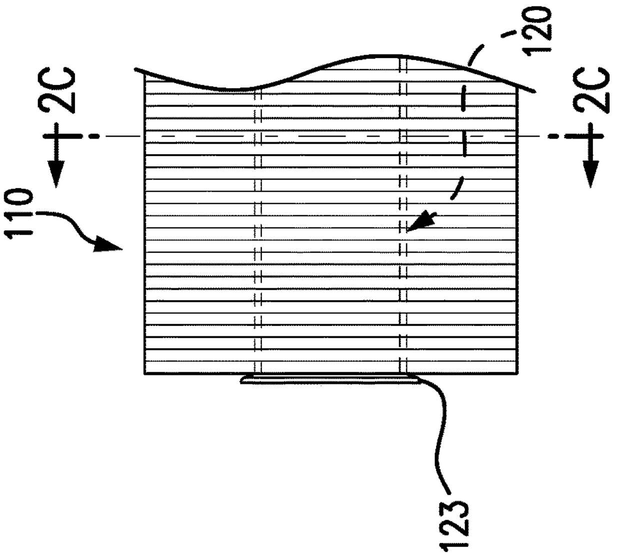
Figure 2A:
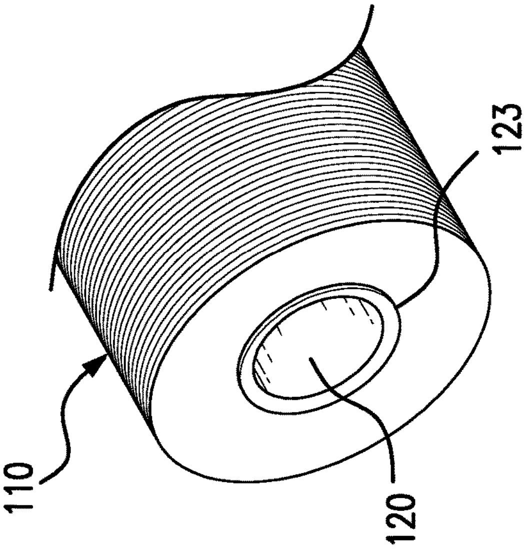
Figure 4:
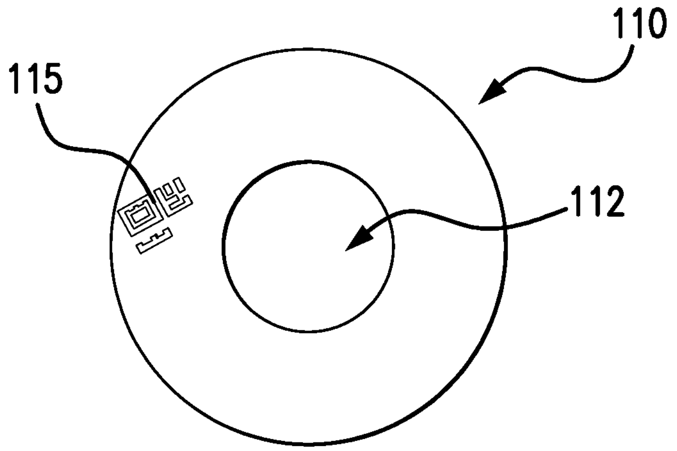
FIG. 4 is a plan view of an annular disk of the irradiation target as shown in FIG. 1.

Referring now to FIGS. 2A, 2B and 4, the majority of the mass of irradiation target 100 lies in the plurality of thin plates 110 that are slideably received on central tube 120. Preferably, each thin plate 110 is a thin annular disk having a thickness in the axial direction of the irradiation target 100 of approximately 0.005 inches. The reduced thickness of each annular disk 110 provides an increased surface area for a given amount of target material. The increased surface area facilitates the process of dissolving the annular disks after they have been irradiated in a fission reactor as part of the process of producing Ti—Mo-99. Additionally, for the preferred embodiment, each annular disk 110 defines a central aperture 112 with an inner-diameter of 0.207 inches so that each annular disk 110 may be slideably positioned on central tube 120. As well, each annular disk has an outer diameter of 0.500 inches that determines the overall width of irradiation target 100. Again, these dimensions will vary for alternate embodiments of irradiation targets dependent upon various factors in the irradiation process they will undergo.

Figure 5:
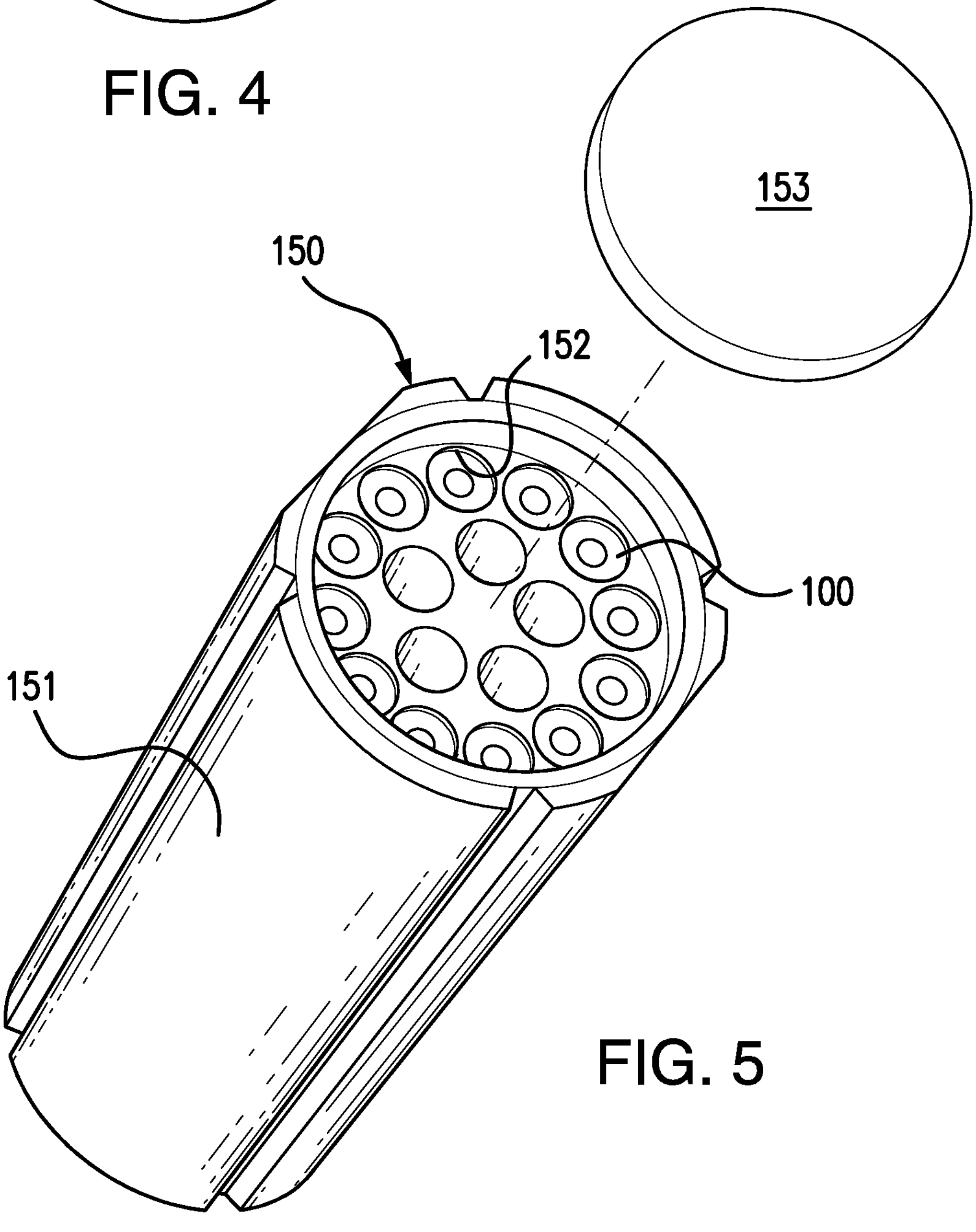
FIG. 5 is a perspective view of a target canister including irradiation targets, such as that shown in FIG. 1, disposed inside the canister.

In the present embodiment, a target canister 150 is utilized to insert a plurality of irradiation targets 100 into a fission nuclear reactor during the irradiation process. As shown in FIG. 5, each target canister 150 includes a substantially cylindrical body portion 151 that defines a plurality of internal bores 152. The plurality of bores 152 is sealed by end cap 153 so that the irradiation targets remain in a dry environment during the irradiation process within the corresponding reactor. Keeping annular disks 110 of the targets dry during the irradiation process prevents the formation of oxide layers thereon, which can hamper efforts to dissolve the thin disks in subsequent chemistry processes to reduce the Mo-99 to a usable form. Preferably, a two-dimensional micro code 115 will be etched into the outer face of the annular disk on one, or both, ends of irradiation target 100 so that each radiation target is individually identifiable. The micro codes 115 will include information such as overall weight of the target, chemical purity analysis of the target, etc., and will be readable by a vision system disposed on a tool alarm (not shown) that inserts and/or removes each irradiation target 100 from a corresponding bore 152 of a target canister 150.

Figure 6C:
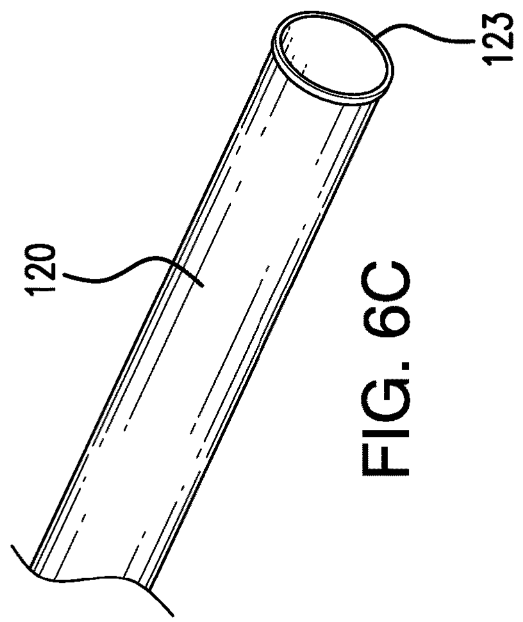
FIGS. 6A-6E are views of the various steps performed to assemble the irradiation target shown in FIG. 1.
Figure 6A:
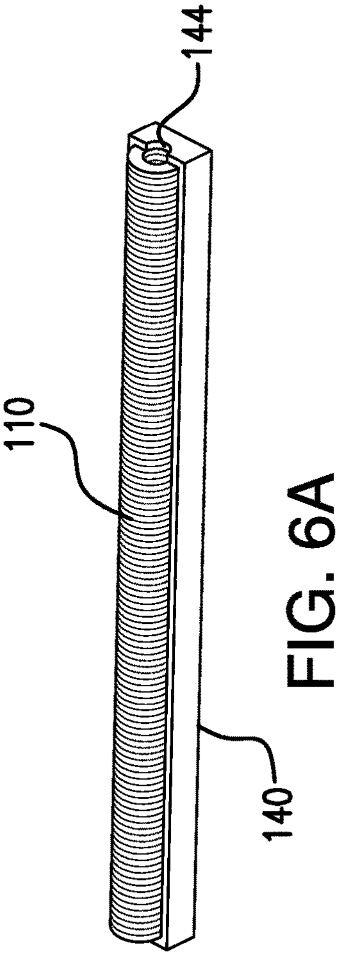
Figure 6B:
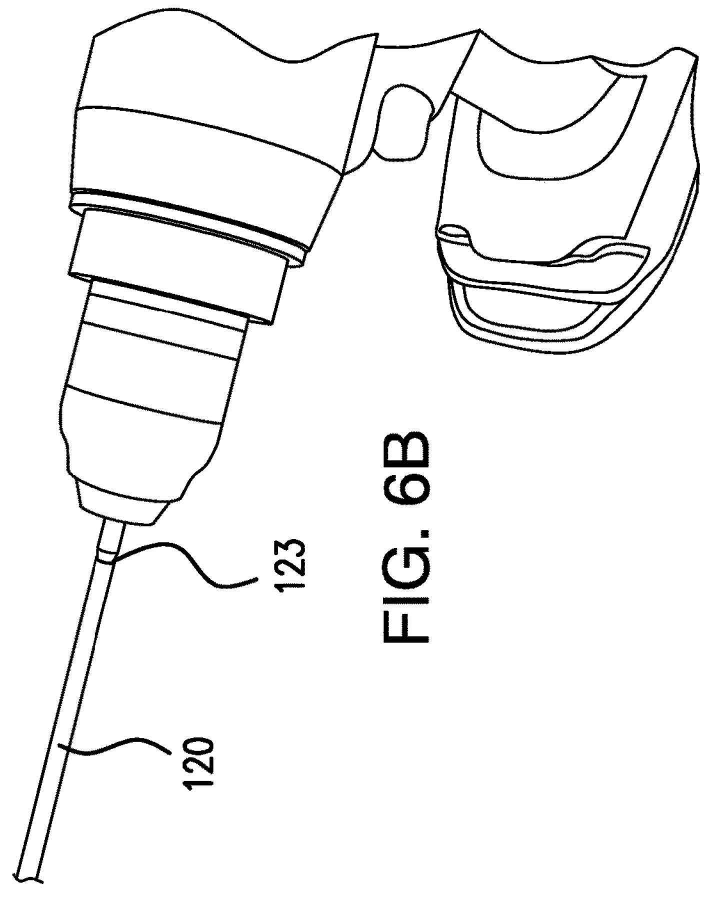
Figure 6D:
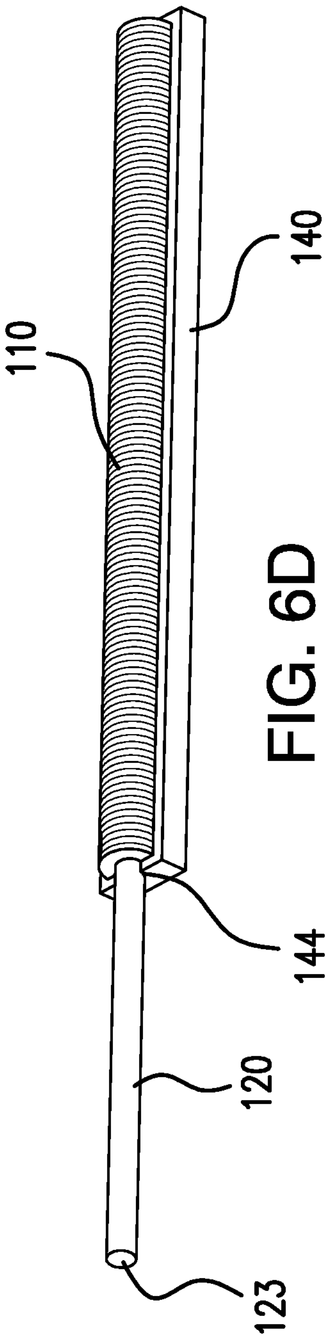
Figure 6E:
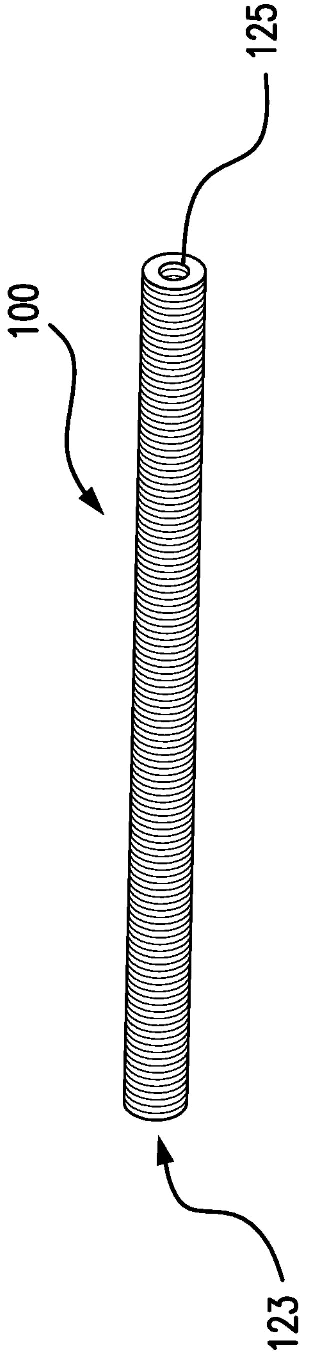
Figure 11:
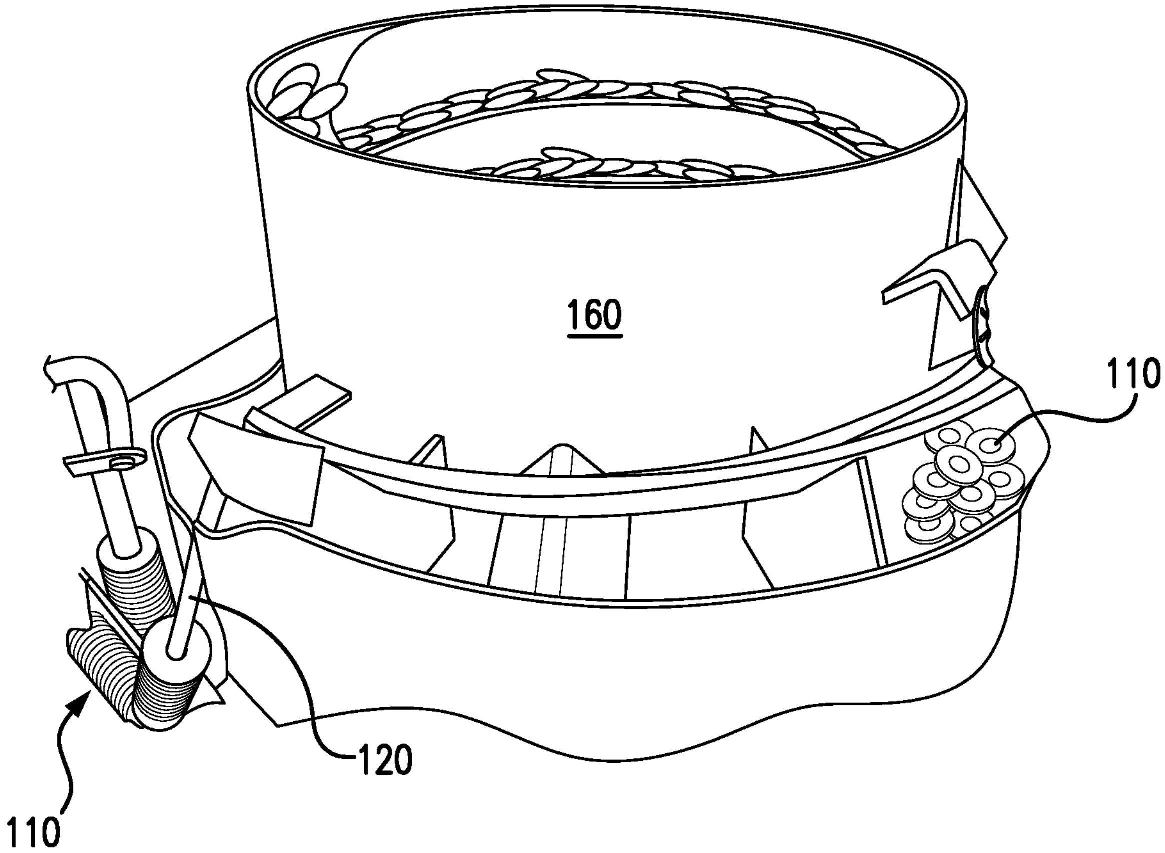
FIG. 11 is a perspective view of a vibratory measurement assembly as may be used in the production of irradiation targets in accordance with the present invention.

Referring now to FIGS. 6A-6E, the assembly process of irradiation target 100 is discussed. As shown in FIG. 6A, a plurality of annular disks 110 is positioned in a semi-cylindrical recess 142 (FIG. 1) of an alignment jig 140. Preferably, alignment jig 140 is formed by a 3-D printing process and the plurality of disks are tightly packed in semi-cylindrical recess 142 so that their central apertures 112 (FIG. 4) are in alignment. In the present embodiment, approximately 1,400 disks 110 are received in alignment jig 140. Although the proper number of disks 110 can be determined manually, in alternate embodiments the process can be automated by utilizing a vibratory loader 160, as shown in FIG. 11, to load the desired number and, therefore, weight of disks into the corresponding alignment jig. Preferably, the outer surface of central tube 120 is scored with a lathe tool to create annular groove 128 (FIG. 3B). As shown in FIGS. 6B and 6C, first end 123 of central tube 120 is flared, thereby creating a first flange 123. As shown in FIG. 6D, the second end of central tube 120 is inserted into the central bore of the plurality of annular disks 110 that are tightly packed in alignment jig 140. A semi-circular recess 144 is provided in an end wall of alignment jig 140 so that central tube 120 may be aligned with the central apertures. Central tube 120 is inserted until first flange 123 comes into abutment with the plurality of annular disk 110. After central tube 120 is fully inserted in the plurality of annular disk 110, the second end of central tube 120 that extends outwardly beyond the annular disks is flared, thereby creating a second flange 125 so that the annular disks are tightly packed on central tube 120 between the flanges. Preferably, the axial loading along central tube 120 will fall within the range of 10-30 lbs.

Figure 9C:
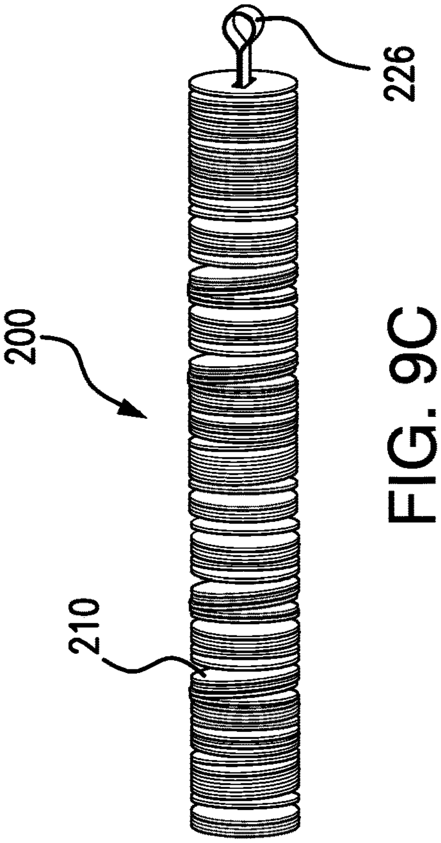
FIGS. 9A-9C are perspective views of an alternate embodiment of an irradiation target in accordance with the present disclosure.
Figure 9B:
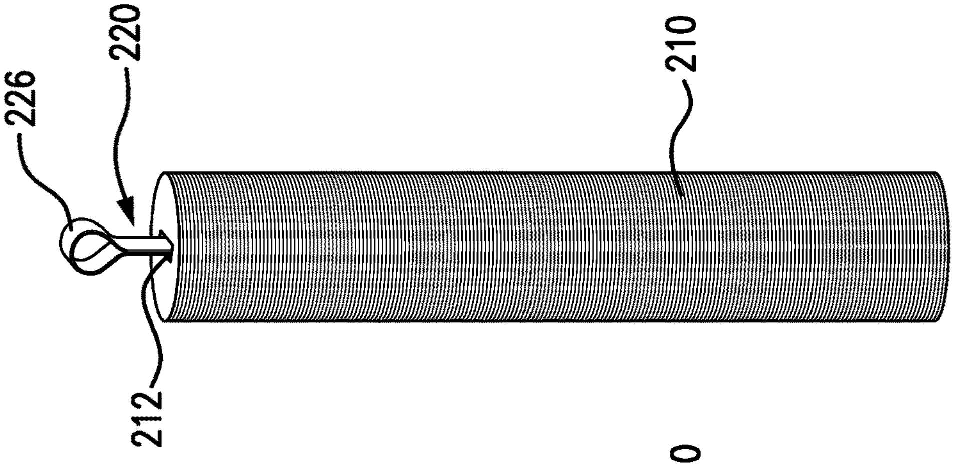
Figure 9A:
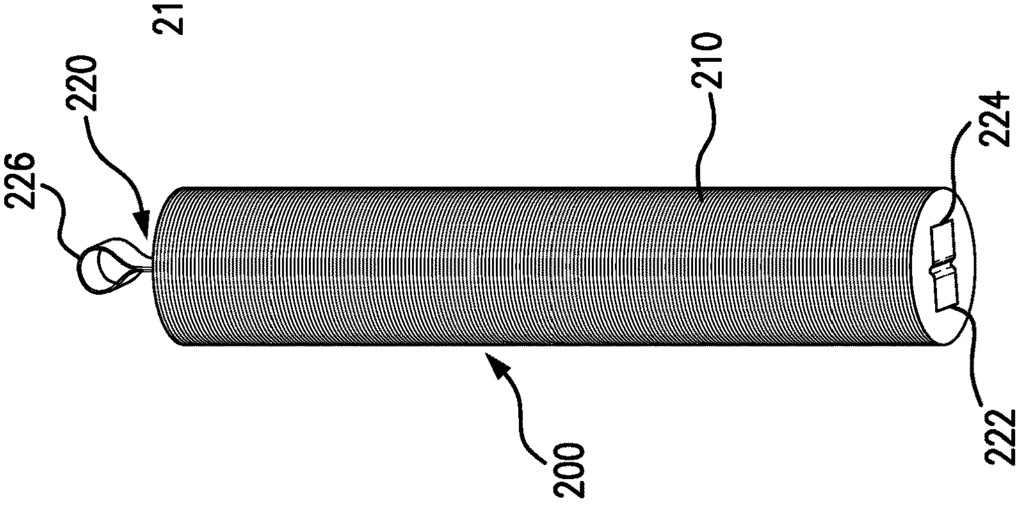

Referring now to FIGS. 9A-9C, an alternate embodiment of an irradiation target 200 in accordance with the present disclosure is shown. Similarly to the previously discussed embodiment, irradiation target 200 includes a plurality of thin plates 210, which are preferably annular disks. Each annular disk 210 defines a central slot 212 through which an elongated strap 220 extends. In this case, strap 220 is a longer strap which is folded back at a turnback bend so that first and second legs of the longer strap are adjacent to one another. Both the first and the second ends of elongated strap 220 define an outwardly extending flange 222 and 224, respectively, which extend in opposite directions, as shown. The flanges 222 and 224 abut an outmost surface of the outmost annular disk 210 at a first end of irradiation target 200. The middle portion of elongated strap 220 extends axially outwardly beyond the plurality of annular disks 210. The turnback bend forms a loop 226 at a second end of irradiation target 200. Loop 226 facilitates handling of irradiation target 200 both before and after irradiation. Preferably, all components of irradiation target 200 are formed of Mo-98, or alloys thereof.

Figure 10A:
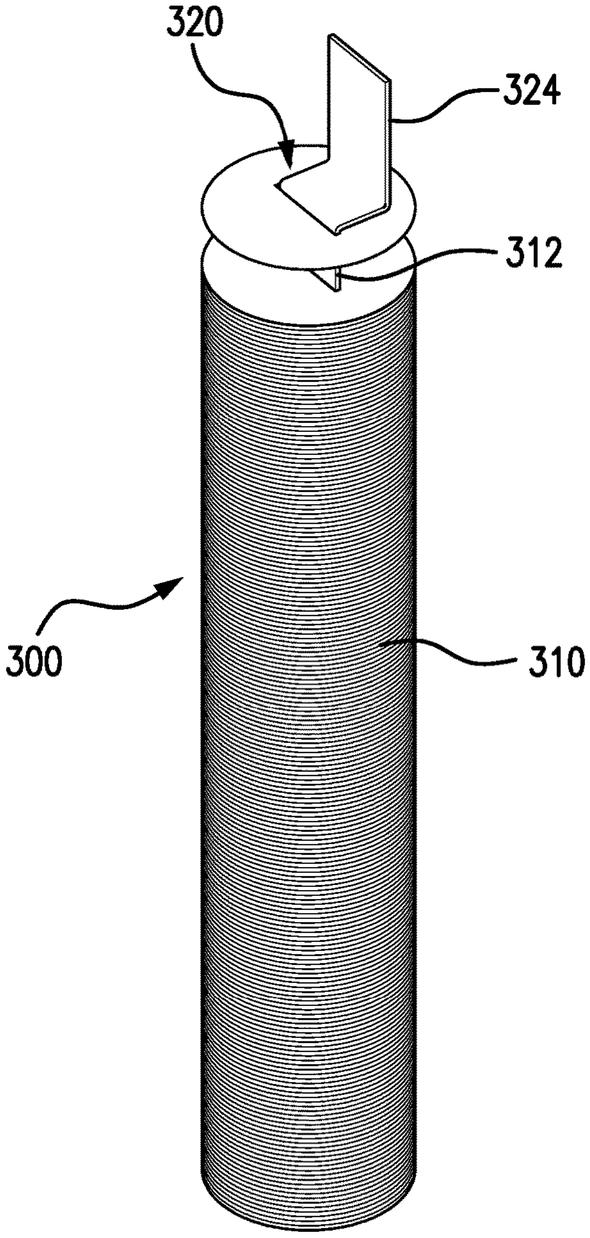
FIGS. 10A and 10B are perspective views of yet another alternate embodiment of an irradiation target in accordance with the present invention.
Figure 10B:
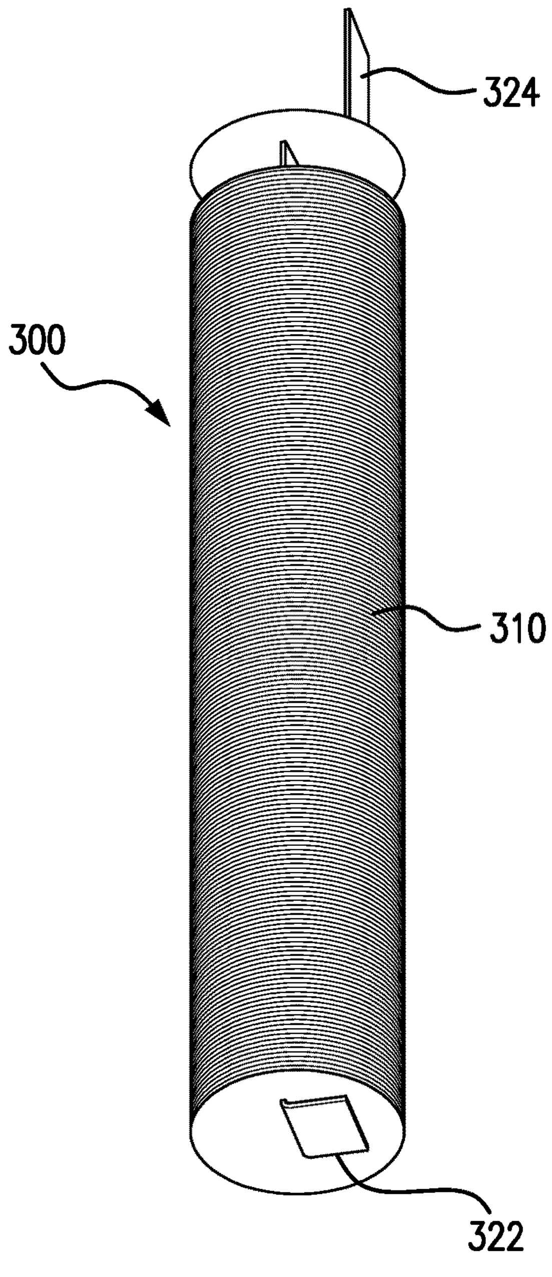

Referring now to FIGS. 10A and 10B, another alternate embodiment of an irradiation target 300 in accordance with the present disclosure is shown. Similarly to the previously discussed embodiments, irradiation target 300 includes a plurality of thin plates 310, which are preferably annular disks. Each annular disk 310 defines a central slot 312 through which an elongated strap 320 extends. A first end of elongated strap 320 defines an outwardly extending flange 322, which abuts an outmost surface of the outmost annular disk 310 at the first end of irradiation target 300. A second end of elongated strap 320 extends axially outwardly beyond the plurality of annular disks 310 and forms a tab 324 at a second end of irradiation target 300. Tab 324 facilitates handling of irradiation target 300 both before and after irradiation. Preferably, all components of irradiation target 300 are formed of Mo-98, or alloys thereof.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

The invention claimed is:

1. An irradiation target for the production of radioisotopes, comprising:

a plurality of plates each defining a central slot; and an elongated strap passing through each slot so that the plurality of plates is retained on the strap, the strap having a cross-sectional shape corresponding to a shape of the slot, wherein the at least one plate and the elongated central member are both formed of materials that produce a selected radioisotope by way of neutron capture.

2. An irradiation target of claim 1, wherein the at least one plate is an annular disk and the at least one plate and the central tube are formed from one of Molybdenum Lanthanum (Mo—La), Titanium Zirconium Molybdenum (Ti—Zr—Mo), Molybdenum Hafnium Carbide (Mo Hf—C), Molybdenum Tungsten (Mo—W), Nickel Cobalt Chromium Molybdenum (Mo-MP35N), and Uranium Molybdenum (U—Mo).

3. An irradiation target of claim 1, wherein each plate is an annular disk and the plurality of annular disks and the elongated strap are formed from molybdenum-98 (Mo-98).

4. An irradiation target of claim 1, wherein the selected radioisotope is molybdenum-99 (Mo-99).

5. An irradiation target of claim 1, wherein the elongated strap includes at least one flange at an end thereof to retain the plurality of plates.

6. An irradiation target of claim 5, wherein the at least one flange comprises a pair of flanges extending in opposite directions.

7. An irradiation target of claim 6, wherein the strap comprises first and second adjacent legs of a longer strap having a turnback bend at a middle portion of the longer strap.

8. An irradiation target of claim 7, wherein the bend is in the form of a loop that facilitates handling of the irradiation target.

* * * * *